United States Patent [19]
Hirofumi

[11] Patent Number: 5,187,698
[45] Date of Patent: Feb. 16, 1993

[54] DATA READING APPARATUS FOR IDENTIFYING POSITION OF DATA TRACKS

[75] Inventor: Kagawa Hirofumi, Tokyo, Japan
[73] Assignee: Kabushiki Kaisha CSK, Tokyo, Japan
[21] Appl. No.: 490,634
[22] PCT Filed: Sep. 20, 1989
[86] PCT No.: PCT/JP89/00954
§ 371 Date: May 17, 1990
§ 102(e) Date: May 17, 1990

[30] Foreign Application Priority Data
Sep. 20, 1988 [JP] Japan ................................ 63-235522

[51] Int. Cl.$^5$ .............................................. E11B 7/00
[52] U.S. Cl. ...................................... 369/47; 369/48; 369/44.11; 235/454
[58] Field of Search ......................... 369/47, 48, 44; 235/454, 456, 462, 470, 487; 358/342

[56] References Cited
U.S. PATENT DOCUMENTS

4,232,216 11/1980 Helle ................................... 235/462
4,652,730 3/1987 Marshall ............................. 235/456
4,855,981 8/1989 Kimura et al. ....................... 369/47
4,970,712 11/1990 Tsuroka et al. ..................... 369/47

*Primary Examiner*—Tommy P. Chin
*Assistant Examiner*—Huy Nguyen
*Attorney, Agent, or Firm*—Lackenbach Siegel Marzullo & Aronson

[57] ABSTRACT

A data reading apparatus for an optical card which reads the optical card having a data area by a reading sensor. The data area on the optical card is formed by aligning a plurality of data tracks, each of which consists of a plurality of data bits, along a reference line extending perpendicular to the data tracks. The data reading apparatus includes a reference line detecting unit for outputting an average position signal on the reference line from a signal obtained by reading the reference line, and a data clock generating unit for generating data clocks which serve as a reference when the data bits are read on the basis of the average position data on the reference line. In consequence, very accurate data clocks can be obtained, and adjustment of an optical system, which would be required in a conventional apparatus, can be eliminated.

4 Claims, 9 Drawing Sheets

DATA READING APPARATUS FOR IDENTIFYING POSITION OF DATA TRACKS

BACKGROUND OF THE INVENTION

1. Technical Field

The present invention relates to a data reading apparatus for an optical card which reads the optical card having a data area formed by aligning a plurality of data tracks each of which consists of a plurality of data bits along a reference line extending perpendicular to the data tracks.

2. Background Art

Figure 5:
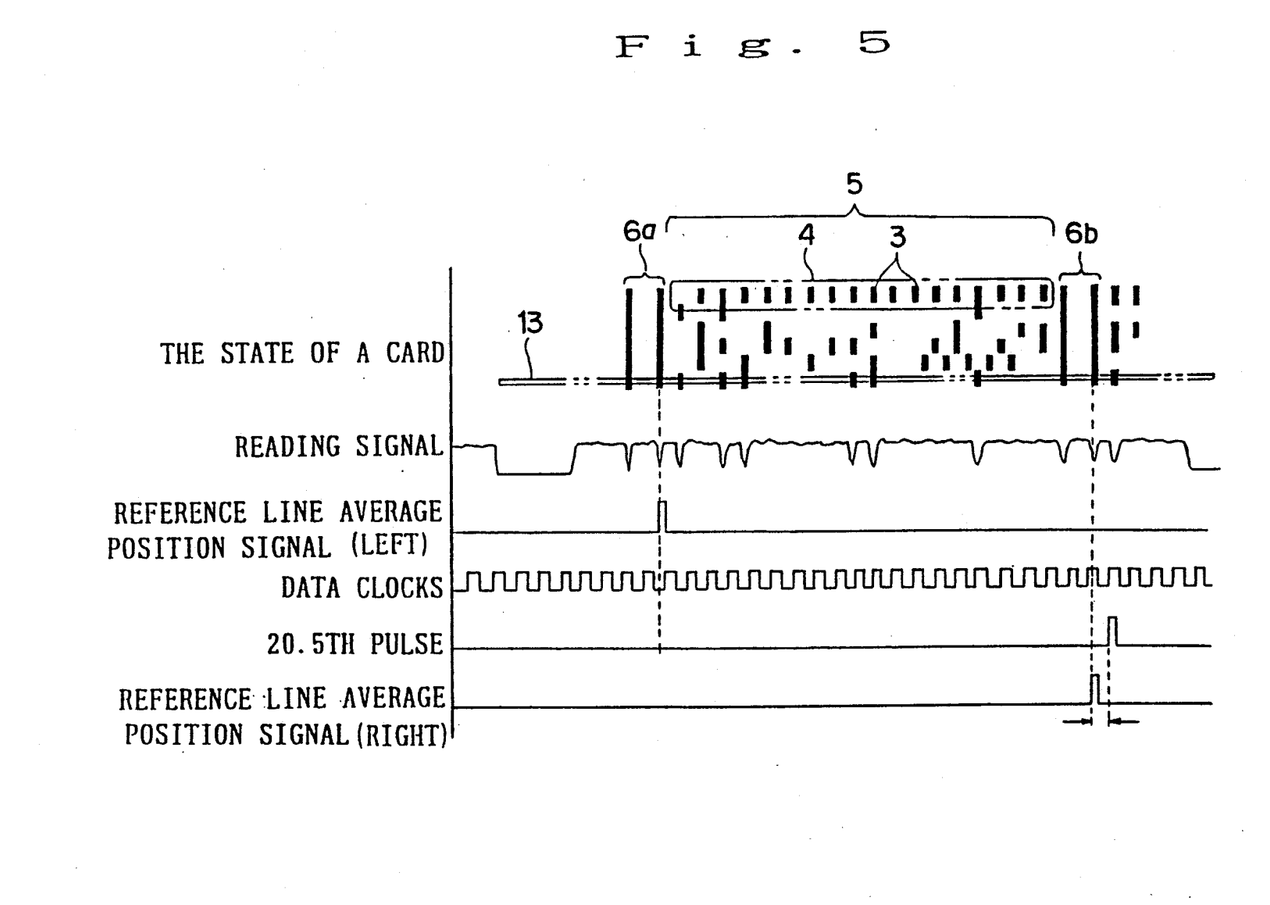
FIG. 5 is a timing chart illustrating the operation of generating data clocks.
Figure 8:
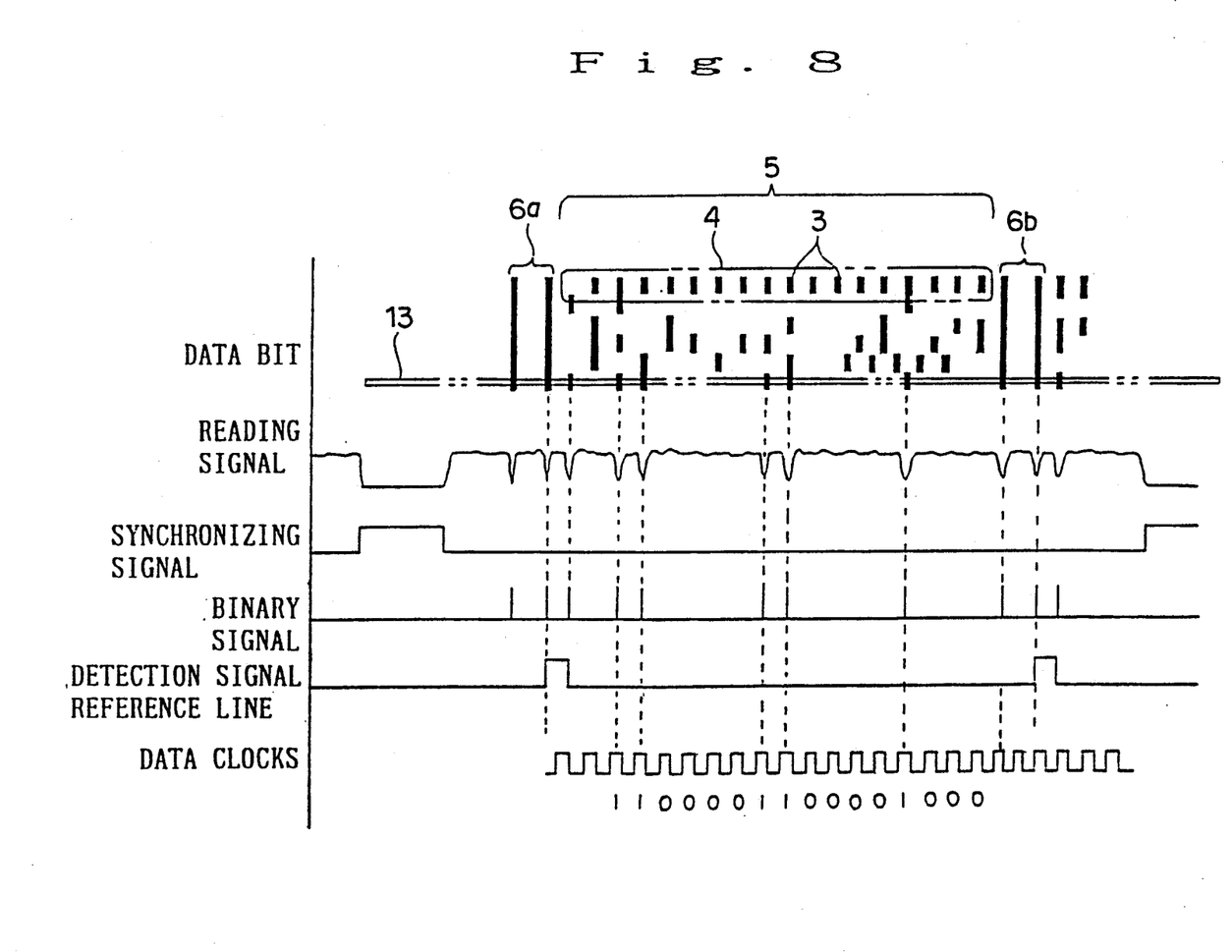
FIG. 8 is a timing chart illustrating the operation of reading an optical card by a conventional reading apparatus.

A data recording area 2 of an optical card 1 (FIGS. 9 and 10) has a plurality of bands 5. (FIGS. 5 and 8.) Each of the bands 5 is formed by vertically aligning data tracks 4, each of which is a row of data bits 3, as shown in FIG. 8. At the left side of the band 5 as viewed in FIG. 8 is provided two reference lines 6a which serve as the reference lines when the data bits 3 are detected. A reference numeral 6b denotes reference lines for a subsequent band 5.

Figure 9:
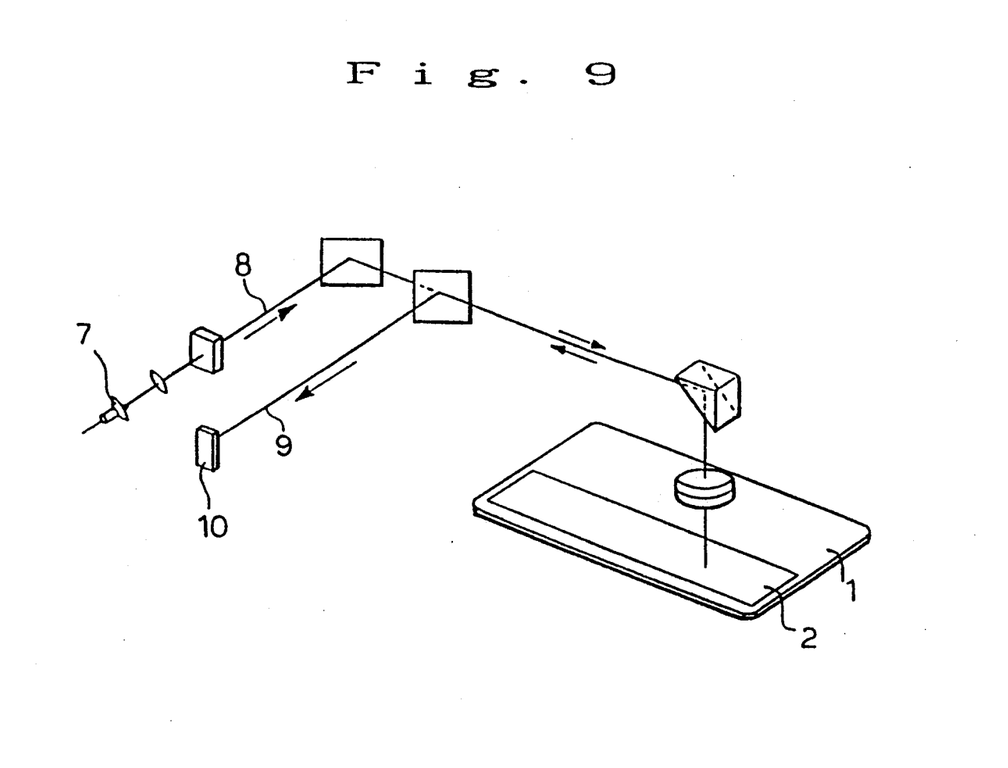
FIG. 9 shows an optical system of the reading apparatus.
Figure 10:
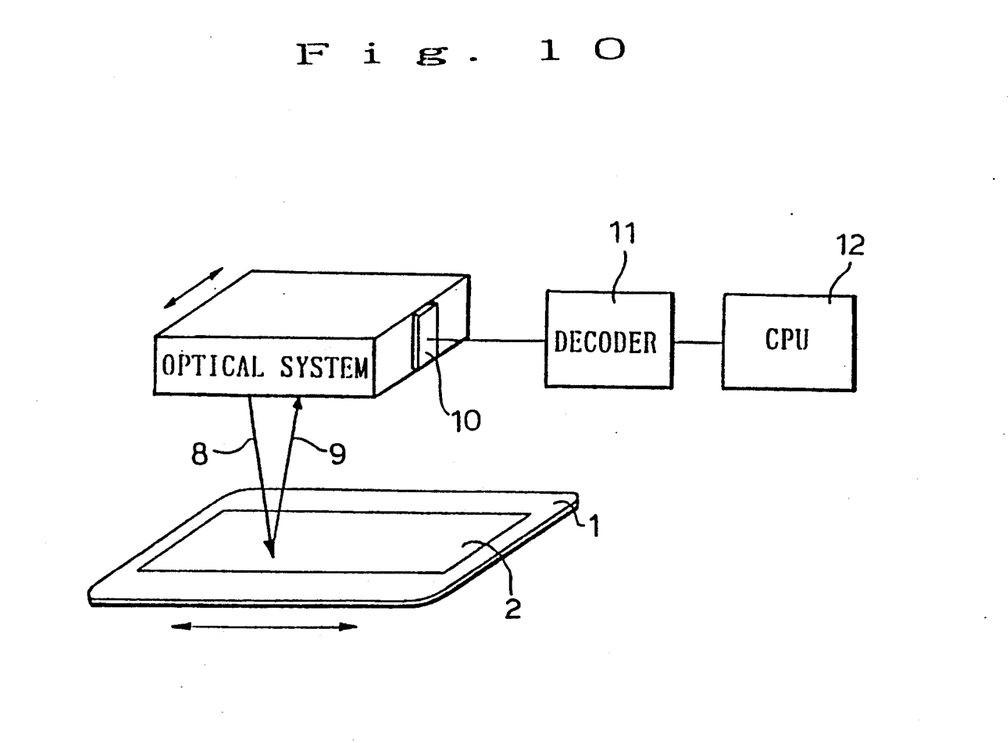
FIG. 10 is a schematic view of the reading apparatus.

When data on such an optical card 1 is to be read, a light 8, e.g., an infrared ray, emitted from an LED 7 is gathered, and the gathered light is irradiated onto the optical card 1, as shown in FIGS. 9 and 10 A light 9 reflected by the optical card 1 is received by an image sensor, such as a CCD line sensor 10. The data bits formed on the surface of the optical card 1 are sent through a decoder 11 to a CPU 12 where they are read.

Figure 4:
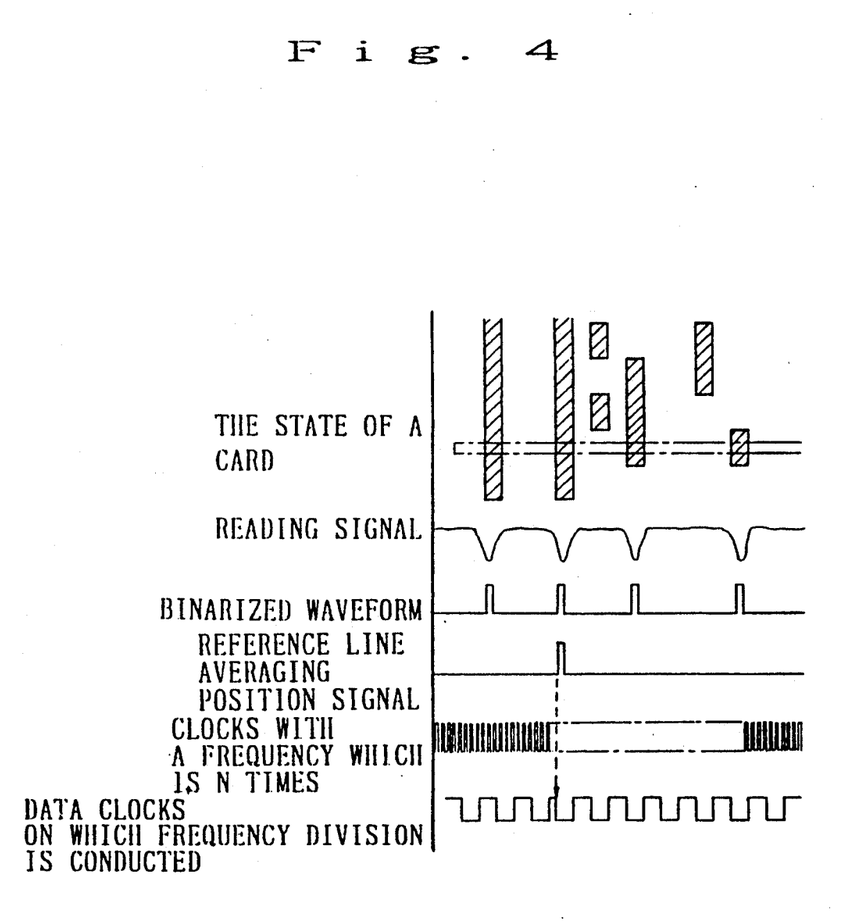
FIG. 4 is a timing chart illustrating the method of synchronizing the phase of data clocks with data.

Viewing of the card from the CCD line sensor 10 is regarded the same as viewing the card 1 through a slit 13 shown in FIG. 4. Scanning of the portion of the card 1 shown by the slit 13 from the left to the right produces a reading signal shown in FIG. 8. I/O of data is determined from the reading signal by determining the presence or absence of the data bit 3.

In a practical data reading operation, scanning of one data track 4 is repeated a plurality of times. In each scanning, a binary signal is read with the detection signal of reference lines 6a as a reference. Hence, in order to accurately read out the data recorded on the optical card 1, the reference lines 6a for the data track 4 must be stably detected and synchronized with data clocks. Various techniques have therefore been proposed including the PLL technique.

However, in the conventional data reading apparatus, in a case where data is separated using data clocks, synchronization of the data with the data clocks requires adjustment of magnification of an optical system.

Furthermore, in a case where the data clock components are extracted from the reading signal using the PLL technique, the reading signal is partitioned by the scanning periods of the sensor, and the phase thereof is not continuous, necessitating provision of synchronization bits to resynchronize the data clocks for each scanning. However, provision of synchronization bits decreases the recording capacity of the optical card 1.

Furthermore, in a case where data is read with a reference line 6a detecting signal as a reference, if the reference lines 6a are damaged or soiled, an accurate detection signal cannot be obtained, or detection signal cannot be obtained at all. These make provision of accurate data clocks and normal reading of the data bits impossible.

DISCLOSURE OF INVENTION

In order to solve the aforementioned problems of the conventional data reading apparatus, the present invention provides a data reading apparatus for an optical card which reads the optical card having a data area by means of a reading sensor. The data area on the optical card is formed by aligning a plurality of data tracks, each of which consists of a plurality of data bits, along a reference line extending perpendicular to the data tracks. The data reading apparatus includes a reference line detecting unit for outputting an average position signal on the reference line from a signal obtained by reading the reference line, and a data clock generating unit for generating data clocks which serve as a reference when the data bits are read on the basis of the average position data on the reference line. The reference line detecting unit includes a reference line detecting circuit for detecting the reference line and outputting a detection signal, an output circuit for producing an output representing the average position data on the reference line on the basis of the detection signal from the reference line detecting circuit, a timing comparing circuit for receiving the output of the reference line detecting circuit and the output of the output circuit and comparing the timings of both outputs, and an integrating circuit for integrating the output of the timing comparing circuit and outputting the results to the output circuit. The data clock generating unit includes an oscillating circuit for outputting clocks whose frequency is N times (N=an integer) that of the created data clocks, a frequency dividing circuit which receives the average position data output from the reference line detecting unit and outputs data clocks whose frequency is one Nth that of the clocks from the oscillating circuit in synchronism with the average position information, a pulse generating circuit which outputs a pulse at a position corresponding to the interval between the reference lines of the data clocks using the average position as a reference, a timing comparing circuit for comparing the timing of a detection signal of a reference line located adjacent to the reference line with that of the pulse, and an integrating circuit which integrates the output of the timing comparing circuit and feeds back the results of the integration to the oscillating circuit to set the frequency.

Since the optical card reading apparatus according to the present invention includes the reference line detecting unit which outputs the average position signal of the reference line from the signal obtained by reading the reference line and the data clock generating unit for generating data clocks which serve as a reference when the data bits are read on the basis of the average position signal of the reference line, very accurate data clocks can be obtained, and adjustment of the magnification of the optical system, which would be required in a conventional apparatus, can be eliminated.

In one preferred form, the oscillating circuit is constructed by a frequency synthesizer which includes a phase comparing circuit, an oscillating circuit and a programmable divider.

In another preferred form, the reading sensor comprises an area sensor.

BEST MODE FOR CARRYING OUT THE INVENTION

An embodiment of the present invention will now be described with reference to the accompanying drawings.

Figure 1:
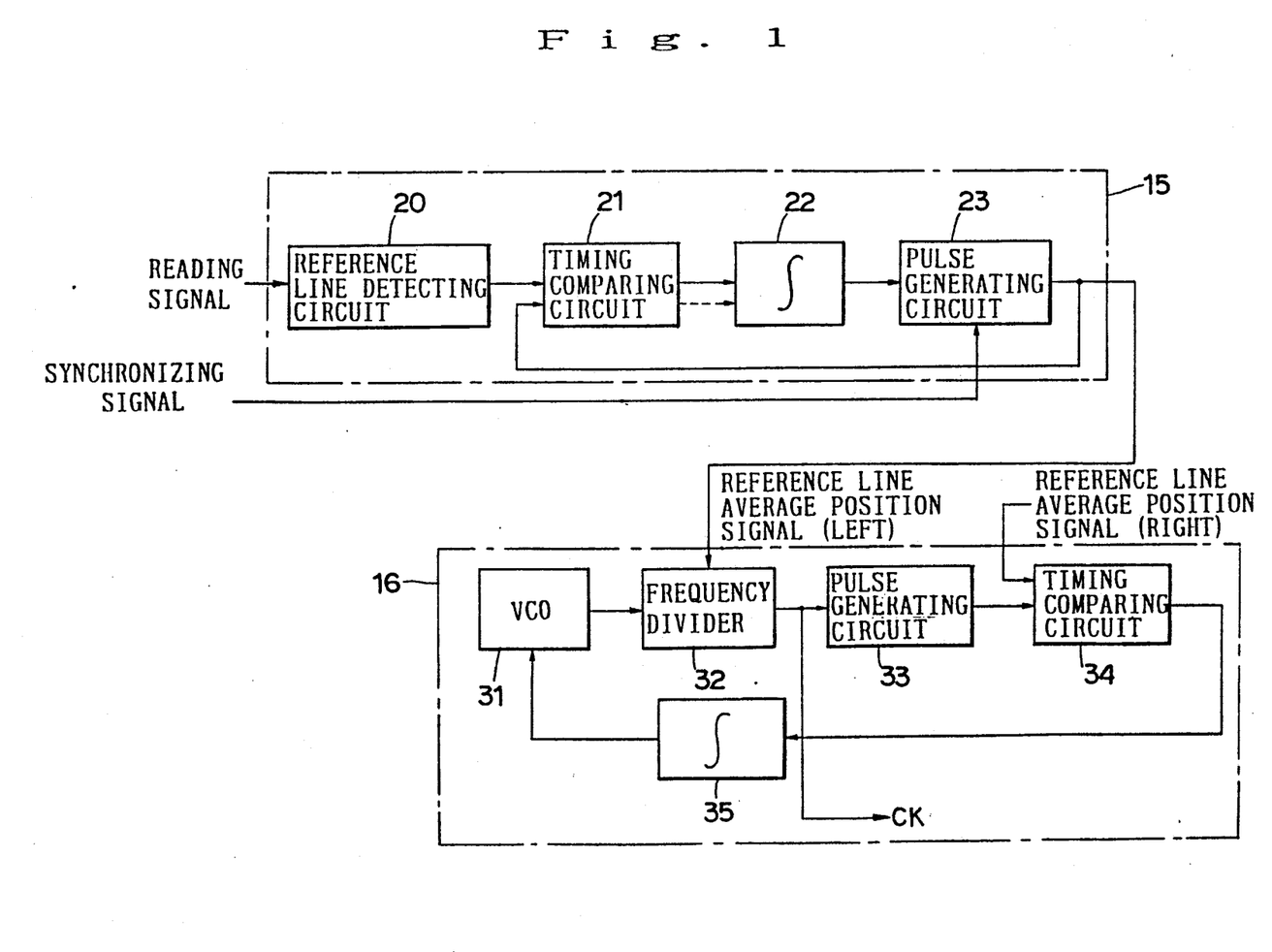
FIG. 1 is a block diagram of an embodiment of the present invention.

FIG. 1 is a block diagram of the first embodiment of the present invention. A data reading apparatus includes a reference line detecting unit 15 and a data clock generating unit 16.

The reference line detecting unit 15 outputs the average position data on the reference lines 6a from the signal obtained by reading the reference lines 6a. The reference line detecting unit 15 includes a reference line detecting circuit 20, a timing comparing circuit 21, an integrating circuit 22 and a pulse generator 23.

The reference line detecting circuit 20 detects the two reference lines 6a separated by an interval longer than that by which the adjacent data bits 3 are separated from the signal obtained by means of the CCD image sensor 10, as shown in FIG. 8, and outputs the detection pulse to the timing comparing circuit 21.

The interval between the two lines which form the reference lines 6a is 1.5 times that between the data bits 3 in the example shown in FIG. 8. The reference line detecting circuit 20 discriminates the reference lines 6a from the data bits 3 using the difference in these intervals.

The pulse generator 23 generates a pulse a predetermined period of time after the output of a synchronizing signal synchronized with a synchronizing pulse used for the scanning by means of the CCD image sensor 10. The signals obtained by reading each data track 4 vary by a small degree while the scanning of that data track 4 is repeated. Hence, the time interval between the portion of the obtained signal which represents the reference lines 6a and the synchronizing signal does not change rapidly.

Figure 3:
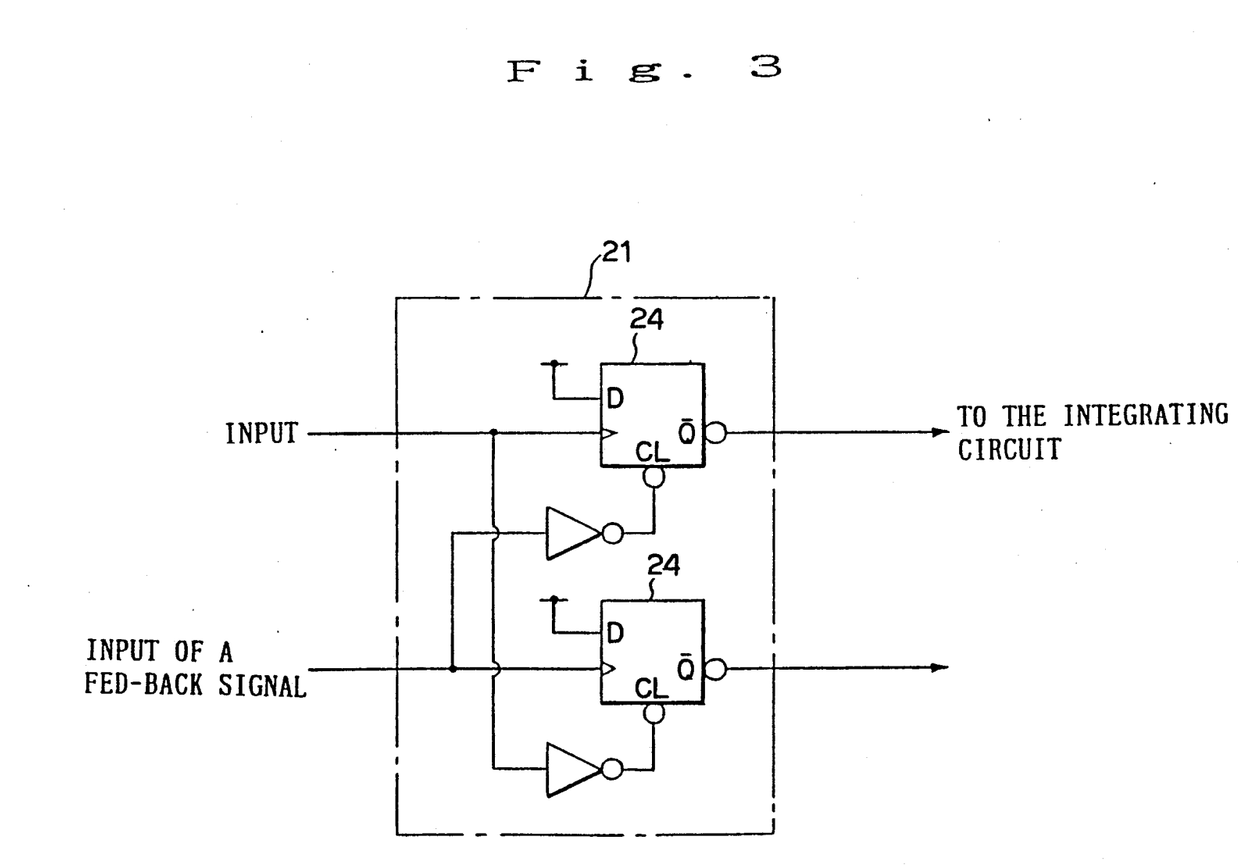
FIG. 3 is a circuit diagram of an example of a timing comparing circuit.

The timing comparing circuit 21 receives at its input the detection pulse of the reference lines 6a and the pulse fed back from the pulse generator 23, detects the order in which the two pulses are output, and outputs a comparison output. This comparison output may be digital, informing that one of the pulses follows or precedes the other. Alternatively, the comparison output may be analog, informing how much one of the pulses is delayed from or precedes the other. The timing comparing circuit 21 may be constructed by a pair of D flip-flops 24, as shown in FIG. 3. However, various other structures may also be adapted.

The integrating circuit 22 is constructed by an up-down counter which counts in an ascending or descending order, depending on the delaying/preceding pulse output from the timing comparing circuit 21. The output of the integrating circuit 22 is used to set the pulse generator 23.

Next, the operation of the reference line detecting unit 15 will be described with reference to FIG. 2 which is the timing chart thereof.

Figure 2:
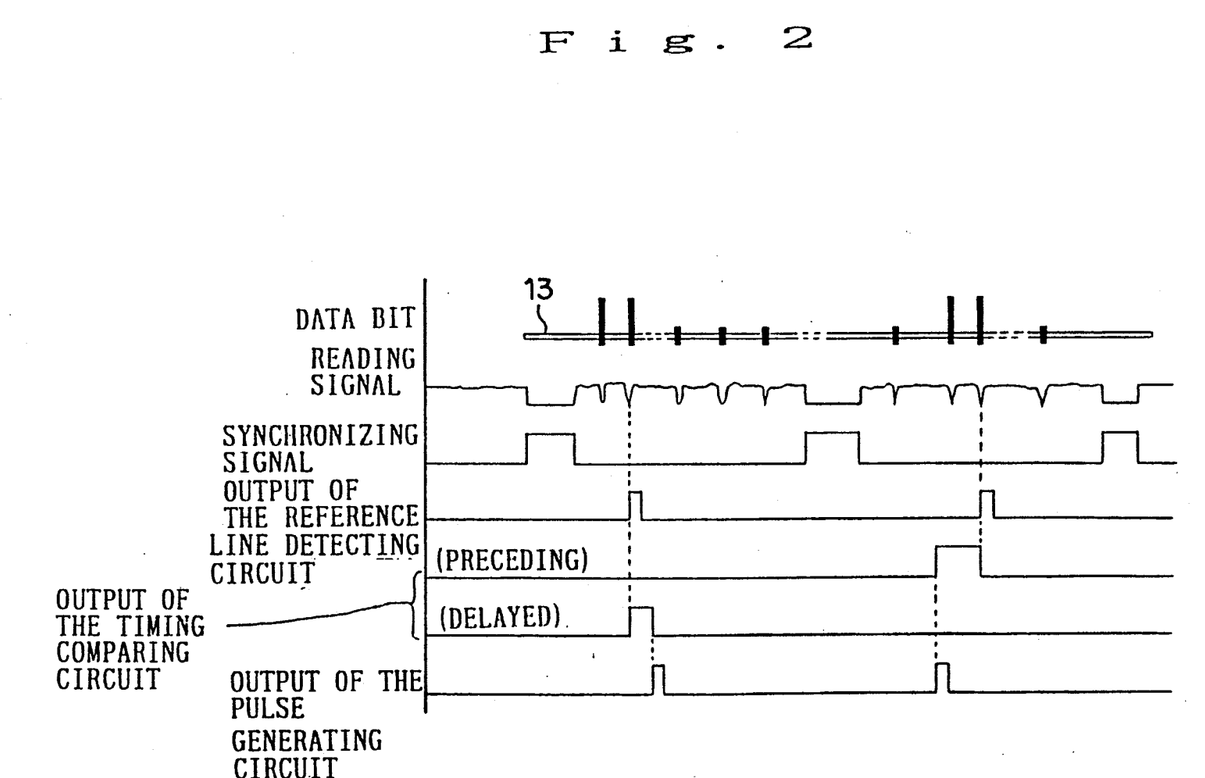
FIG. 2 is a timing chart, illustrating the operation of the apparatus of FIG. 1.

In FIG. 2, the comparison output of the timing comparison circuit 21 obtained in a case where the output pulse of the pulse generator 23 precedes the detection pulse of the reference lines 6a and that of the time comparison circuit 21 obtained in a case where the output pulse of the pulse generator 23 follows the detection pulse of the reference lines 6a are shown for the convenience of understanding.

In a case where the comparison output of the timing comparison circuit 21 is "preceding", the integrating circuit 22 conducts integration by increasing the comparison output value. In a case where the comparison output of the timing comparison circuit 21 is "delayed", the integrating circuit 22 conducts integration by decreasing the comparison output value.

The pulse generator 23 receives the output of the integrating circuit 22, and changes the time interval between the synchronizing signal and its output pulse in accordance with the output of the integrating circuit 22. Also, the output of the pulse generator 23 is fed back to the timing comparing circuit 21 where it is compared with the detection pulse of the reference lines 6a. Such a comparison operation continues while scanning of the data track 4 is repeated a plurality of times, by which the output of the pulse generator 23 is controlled and coincided with the output of the reference line detecting circuit 20 so as to average the position information on the reference lines 6a and thus provide stable detection results of the reference lines 6a.

In consequence, even if an anomaly occurs in the output of the reference line detecting circuit 20 due to the damage to the optical card or the like, the value of the integrating circuit 22 does not change or changes at a small rate, so normal detection results are maintained for a while.

The data clock generating unit 16 generates data clocks which serve as a reference when the data bits are read on the basis of the position information on the reference lines 6a and 6b. The data clock generating unit 16 includes an oscillating circuit 31, a frequency dividing circuit 32, a pulse generating circuit 33, a timing comparison circuit 34 and an integrating circuit 35.

The oscillating circuit (VCO) 31 outputs clocks whose frequency is N times (N=an integer) that of finally created data clocks.

The frequency dividing circuit 32 receives the average position information on the left reference lines 6a from the reference line detecting unit 15, and outputs data clocks "CK" whose frequency is one Nth that of the clocks output from the oscillating circuit 31 and which are synchronized with the average position information.

The pulse generating circuit 33 generates a pulse at a position corresponding to the interval between the left and right reference lines 6a and 6b using the average position of the data clock as a reference.

The timing comparing circuit 34 compares the timing of the detection signal of the right reference lines 6b with that of the pulse of the pulse generating circuit 33.

The detection pulse of the right reference lines 6b may be or may not be the average position information obtained by the reference line detecting unit 15.

The integrating circuit 35 integrates the output of the timing comparing circuit 34, and feeds back the results of the integration to the oscillating circuit 31 so as to adjust the frequency of the clocks.

Generation of the data clocks will be described below with reference to FIGS. 4 and 5.

The data clocks which are synchronized with the average position signal of the left reference lines 6a and whose frequency is one Nth that of the clocks output from the oscillating circuit 31 are instantaneously obtained by clearing the frequency dividing circuit 32 using the average position signal of the left reference lines 6a, as shown in FIG. 4. In that case, the larger the value N, the smaller the phase error.

The left and right reference lines 6a and 6b are separated by an interval which is several tens of times that between the data bits 3. In this embodiment, the interval between the left and right reference lines 6a and 6b is 20.5 times that between the data bits 3. So, the pulse generating circuit 33 generates a pulse at a position which corresponds to the 20.5th data clock produced by the frequency divider 32 using the average position of the reference lines 6a as a reference, as shown in FIG. 5.

The timing comparing circuit 34 compares the timing of the thus-produced pulse with that of the position signal of the right reference lines 6b which is taken out from the signal obtained by reading the data track 4. If the frequency of the data clocks produced by the frequency divider 2 is in synchronism with the position signal, the two pulses are output at the same time. If the frequency of the data clocks is too high, the 20.5th pulse precedes the position signal. In the reverse case, the 20.5th pulse follows the position signal.

The output of the timing comparing circuit 34 is fed back to the oscillating circuit 31 through the integrating circuit 35, by which the frequency of the clocks generated by the oscillating circuit 31 is set in accordance with the comparison results.

This results in generation of very accurate data clocks.

Figure 6:
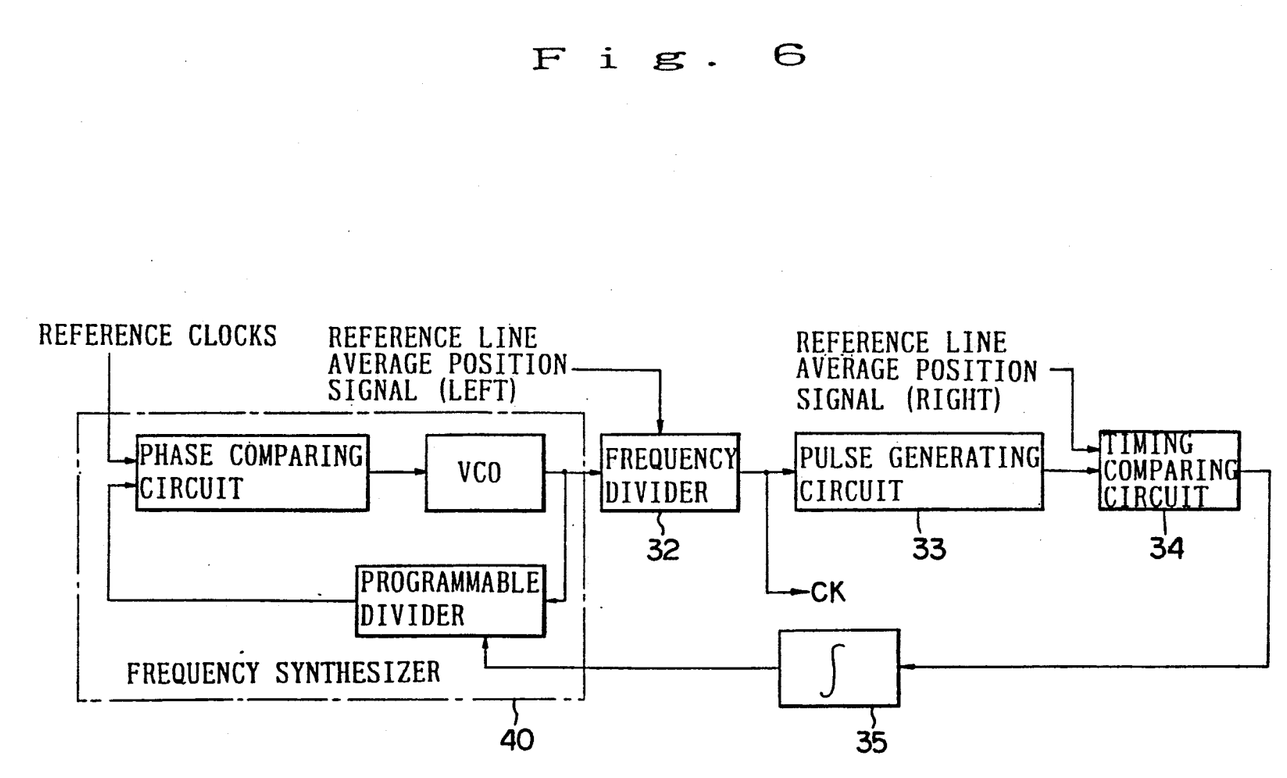
FIG. 6 is a block diagram of another embodiment of the present invention.

Next, a second embodiment of the present invention will be described with reference to FIG. 6. This embodiment employs a frequency synthesizer 40 in place of the oscillating circuit 31 shown in FIG. 1 in order to produce further stabilizes data clocks.

Figure 7:
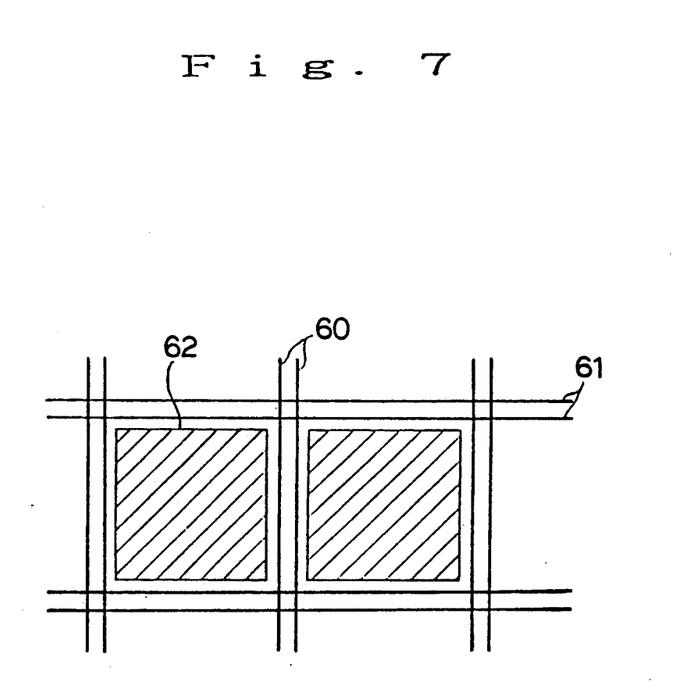
FIG. 7 shows an example of the format of an optical card which is read by an area sensor.

The above-described embodiments employ a line sensor to read the optical card 1. However, the data reading apparatus of the present invention may also use an area sensor. In the case of a format in which recording areas 62 are formed by making reference lines 60 intersect reference lines 61, as shown in FIG. 7, data clocks in the horizontal direction may be generated with the vertical reference lines 60 using as a reference while data clocks in the vertical direction may be generated with the horizontal reference lines 61 using as a reference.

What is claimed is:

1. A data reading apparatus for an optical card having a data area, comprising a reading means for reading a data area on the optical card, said data area of the optical card being formed of a plurality of generally parallel data tracks aligned along a predetermined direction, each of which consists of a plurality of data bits, and at least one reference line extending perpendicular to the direction of the data tracks; detecting means for reading a reference line and ouputting an average position signal of the reference line; and a data clock generating means for generating data clock pulses which serve as a reference when the data bits are read on the basis of the average position signal of the reference line, said detecting means including a reference line detecting circuit for detecting the reference line and ouputting a detection signal, said detecting means having a circuit ouput for outputting the average position signal of the reference line, a first timing comparing means for receiving said detection signal of said reference line detecting circuit and said average position signal of said detecting means and comparing the timings of said detection signal and said average position signal and generating a first comparison signal, and first integrating means for integrating said first comparison signal of said first timing comparing means and ouputting an integrated signal to said circuit output, said data clock generating means including an oscillating circuit for ouputting timing clock pulses having a predetermined frequency, a frequency dividing circuit receiving the average position signal output from said detecting means and outputting data clock pulses having a frequency one Nth of the predetermined frequency of the timing clock pulses from said oscillating circuit in synchronism with the average position signal, a pulse generating circuit receiving said data clock pulses and ouputting a reference pulse at a position corresponding to the interval between a pair of adjacent reference lines of the data clock pulses using the average position signal as a reference, a second timing comparing means for comparing the timing between a detection signal corresponding to a reference line and said reference pulse and generating a second comparison signal, and second integrating means for integrating said second comparison signal of said second timing comparing means and feeding back an integrated signal to said oscillating circuit to set said predetermined frequency.

2. A data reading apparatus for an optical card according to claim 1, wherein said oscillating circuit comprises a frequency synthesizer.

3. A data reading apparatus for an optical card according to claim 2, wherein said frequency synthesizer inclues a phase comparing circuit, an oscillator, and a programmable divider.

4. A data reading apparatus for an optical card according to claim 1, wherein said reading means comprises an area sensor.

* * * * *